(12) United States Patent
Ponnampalam et al.

(10) Patent No.: US 9,923,434 B2
(45) Date of Patent: Mar. 20, 2018

(54) ROTOR END BAND

(71) Applicant: HAMILTON SUNDSTRAND CORPORATION, Windsor Locks, CT (US)

(72) Inventors: Kavithas Ponnampalam, Machesney Park, IL (US); Jong-Yeong Yung, Rockford, IL (US); William Louis Wentland, Rockford, IL (US); Craig R. Legros, Rockford, IL (US); Kevin L Dickerson, Loves Park, IL (US); Davis S. Behling, Belvidere, IL (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 762 days.

(21) Appl. No.: 14/466,502

(22) Filed: Aug. 22, 2014

(65) Prior Publication Data

US 2014/0360242 A1    Dec. 11, 2014

Related U.S. Application Data

(62) Division of application No. 13/406,927, filed on Feb. 28, 2012, now abandoned.

(51) Int. Cl.
| | |
|---|---|
| *H02K 15/02* | (2006.01) |
| *H02K 1/28* | (2006.01) |
| *B21D 26/021* | (2011.01) |
| *B21D 53/16* | (2006.01) |
| *H02K 3/30* | (2006.01) |
| *H02K 3/38* | (2006.01) |
| *H02K 15/10* | (2006.01) |
| *C22F 1/10* | (2006.01) |

(52) U.S. Cl.
CPC ............... *H02K 15/02* (2013.01); *H02K 1/28* (2013.01); *H02K 3/30* (2013.01); *H02K 3/38* (2013.01);
(Continued)

(58) Field of Classification Search
CPC .... B21D 26/02; B21D 26/021; B21D 26/053; B21D 51/10; B21D 53/16; B21D 22/20;
(Continued)

(56) References Cited

U.S. PATENT DOCUMENTS

| | | | | |
|---|---|---|---|---|
| 1,444,630 | A | * 2/1923 | Mirfield ................. | B21D 53/16 29/890.14 |
| 2,847,957 | A | * 8/1958 | Watter ................... | B21D 26/02 220/DIG. 22 |

(Continued)

FOREIGN PATENT DOCUMENTS

| | | |
|---|---|---|
| JP | 09131006 A | 5/1997 |
| JP | 11238614 A | 8/1999 |
| JP | 4693677 B2 | 6/2011 |

OTHER PUBLICATIONS

"Inconel Material Properties and Applications", Altemp Alloys, Inc., accessed Apr. 20, 2017, http://www.altempalloys.com/inconel-alloys.html.*

(Continued)

*Primary Examiner* — Christopher Besler
*Assistant Examiner* — Matthew P Travers
(74) *Attorney, Agent, or Firm* — Cantor Colburn LLP

(57) ABSTRACT

An end band and method of forming an end band for a rotor. The end band includes a hollow cylindrical band, wherein at least a portion of the band has a grain flow in a direction parallel to the hoop stress of the band. The end band also includes at least a portion having a grain flow in a direction perpendicular to the hoop stress of the band.

8 Claims, 5 Drawing Sheets

(52) U.S. Cl.
CPC ......... *H02K 15/105* (2013.01); *B21D 26/021* (2013.01); *B21D 53/16* (2013.01); *C22F 1/10* (2013.01)

(58) Field of Classification Search
CPC .... B21D 22/205; B21D 22/208; B21D 22/21; B21D 22/28; F16B 21/00; F16B 21/186; H02K 1/28; Y10T 29/49009; Y10T 29/49012; Y10T 29/49805; C22F 1/10
USPC ....... 310/216.114–216.119, 216.114–216.11; 148/593, 624
See application file for complete search history.

(56) References Cited

U.S. PATENT DOCUMENTS

| | | | |
|---|---|---|---|
| 3,260,505 A | 7/1966 | Ver Snyder | |
| 3,677,830 A * | 7/1972 | Allen | C22F 1/10 148/410 |
| 3,706,118 A * | 12/1972 | Hilton | B21C 23/01 72/267 |
| 4,711,611 A * | 12/1987 | Bachmann | B21D 51/26 413/69 |
| 5,668,421 A | 9/1997 | Gladish | |
| 6,550,122 B1 * | 4/2003 | Imai | B21D 53/14 148/228 |
| 2004/0168301 A1 | 9/2004 | Tornquist et al. | |
| 2004/0180776 A1 | 9/2004 | Brandt | |
| 2012/0006452 A1 * | 1/2012 | Mitchell | C22C 1/023 148/671 |

OTHER PUBLICATIONS

Inconel Alloy 718, Special Metals Corporation, Sep. 2007, Publication No. SMC-045, pp. 2 and 27.*

Chinese Office Action for Application No. 201310175071.0; dated Jan. 6, 2015; dated Mar. 5, 2015; 15 pages.

* cited by examiner

ROTOR END BAND

CROSS-REFERENCE TO RELATED APPLICATION

This application claims the benefit of U.S. patent application Ser. No. 13/406,927 filed Feb. 28, 2012, the entire contents of which are incorporated herein by reference.

BACKGROUND OF THE INVENTION

This invention relates to generators and, more particularly, to an end band for a generator.

A generator system, such as that found in aircrafts, ships, and some terrestrial vehicles, may include three separate generators, a permanent magnet generator (PMG), an exciter, and a main generator. Rotation of the rotor of the PMG induces an alternating current in the stator of the PMG. This alternating current is commonly sent through a rectifier where it is converted to an output as a direct current. This direct current is provided to the stator of the exciter and as a result of rotation of the exciter rotor, creates and alternating current output. Rectifier circuits rectify this alternating current and the resulting direct current is provided to the rotor of the main generator. As the rotor of the main generator rotates, alternating current is induced in the main generator stator and this can be output to the system. The components of a rotor of all of these generators must remain in place during rotation. To this end and by way of example, the exciter rotor typically includes a pair of end bands that hold critical parts of the exciter rotor in a desired position while withstanding the centrifugal forces and hoop stress acting on it.

Historically, end bands have been made of high strength, critical alloys well suited for use in extreme environments of pressure and heat. Presently, end bands are machined from a solid piece of bar stock having a diameter at least equal to the outside diameter of the end band. Because each end band is a hollow cylinder of a generally narrow thickness, the majority of the bar stock used to create each part is, therefore, wasted making the cost per part expensive relative to the percentage of the material used. Another method for forming an end band includes welding a rolled sheet to form a band. However, this welding method may be equally cost prohibitive because of the minimal tolerances required for the band.

BRIEF DESCRIPTION OF THE INVENTION

According to one embodiment of the invention, an end band is provided including a hollow cylindrical band. A portion of the band has a grain flow in a direction parallel to a hoop stress of the band. The end band also includes a portion of the band having a grain flow in a direction perpendicular to the hoop stress of the band.

According to another embodiment of the invention, a rotor is provided including at least one lamination including a plurality of teeth. At least one insulation ring having a plurality of teeth is attached to the lamination. Slot insulation is disposed between the teeth of the lamination and the teeth of the insulation ring. Wire windings are wrapped around the teeth of the lamination and insulation rings. The rotor also includes at least one hollow cylindrical end band surrounding the rotor or its components. At least a portion of the end band has a grain flow in a direction parallel to a hoop stress of the end band, and at least a portion of the end band has a grain flow in a direction perpendicular to the hoop stress of the end band.

According to yet another embodiment of the invention, a method for manufacturing an end band is provided including hydroforming a hollow cylinder having an open end and a closed end. The hollow cylinder is then stress-relieved. After being stress-relieved, the hollow cylinder is then aged. The closed end of the cylinder is then removed to form an end band.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
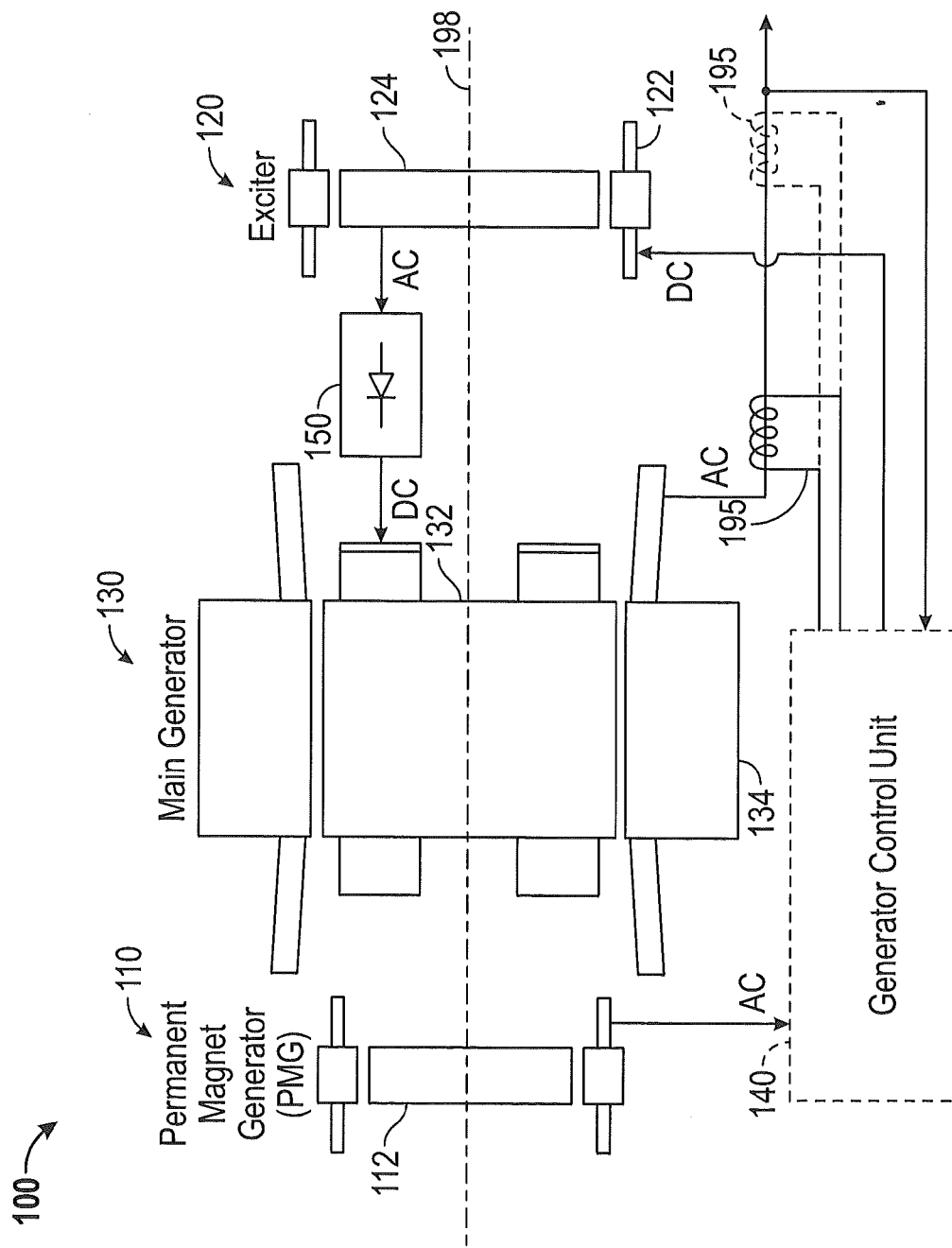
FIG. 1 is a functional schematic block diagram of an exemplary generator system.

Though the present invention is described in relation to a rotor of a generator, a person having ordinary skill in the art would understand that the present invention may be adapted for use with a motor as well. Referring to FIG. 1, a functional schematic block diagram of an exemplary generator system 100 for use with a turbine engine is illustrated. This exemplary generator system 100 may include a permanent magnet generator (PMG) 110, an exciter 120, a main generator 130, a generator control unit 140, and one or more rectifier assemblies 150. During operation, a rotor 112 of the PMG 110, a rotor 124 of the exciter 120, and a rotor 132 of the main generator 130 all rotate. The rotational speed of these components may vary. As the PMG rotor 112 rotates, the PMG 110 generates and supplies alternating current (AC) power to the generator control unit 140, which in turn supplies direct current (DC) power to a stator 122 of the exciter 120. The exciter rotor 124 in turn supplies AC power to the rectifier assemblies 150. The output from the rectifier assemblies 150 is DC power and is supplied to the main generator rotor 132, which in turn outputs AC power from a main generator stator 134. The generator control unit 140 can regulate the power output based upon monitoring signals provided to it from monitoring devices 195. As depicted, the PMG rotor 112, the exciter rotor 124, and the main generator rotor 132 all rotate along a single axis 198 at the same rotational speed. In other embodiments, each of these rotor components may rotate along a different axis. The relative positioning of the PMG 110, the exciter 120, and the main generator 130 can be modified such that the exciter is physically between the PMG 110 and the main generator 130.

Figure 2:
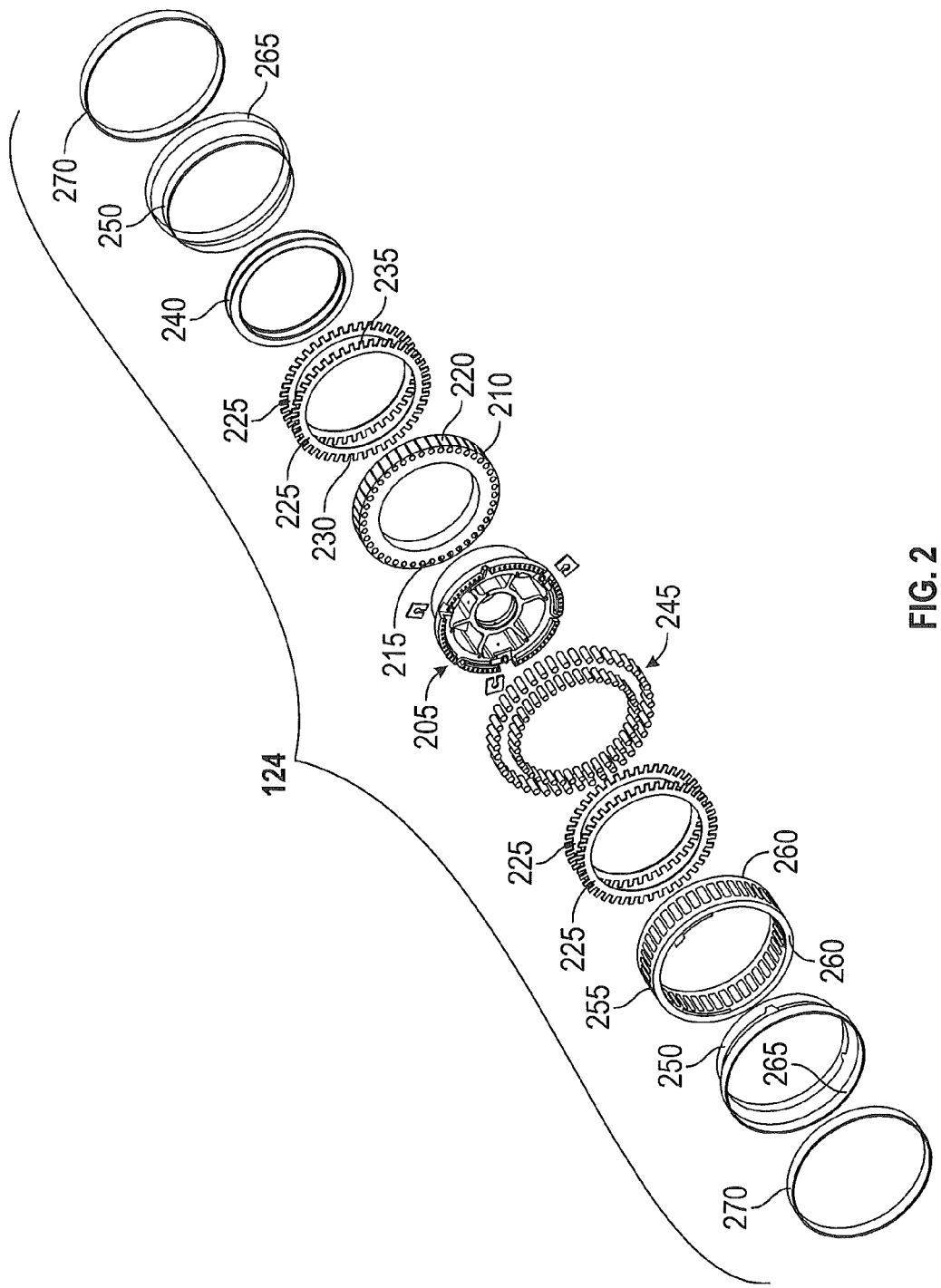
FIG. 2 is an exploded perspective view of an exemplary exciter rotor assembly.
Figure 3:
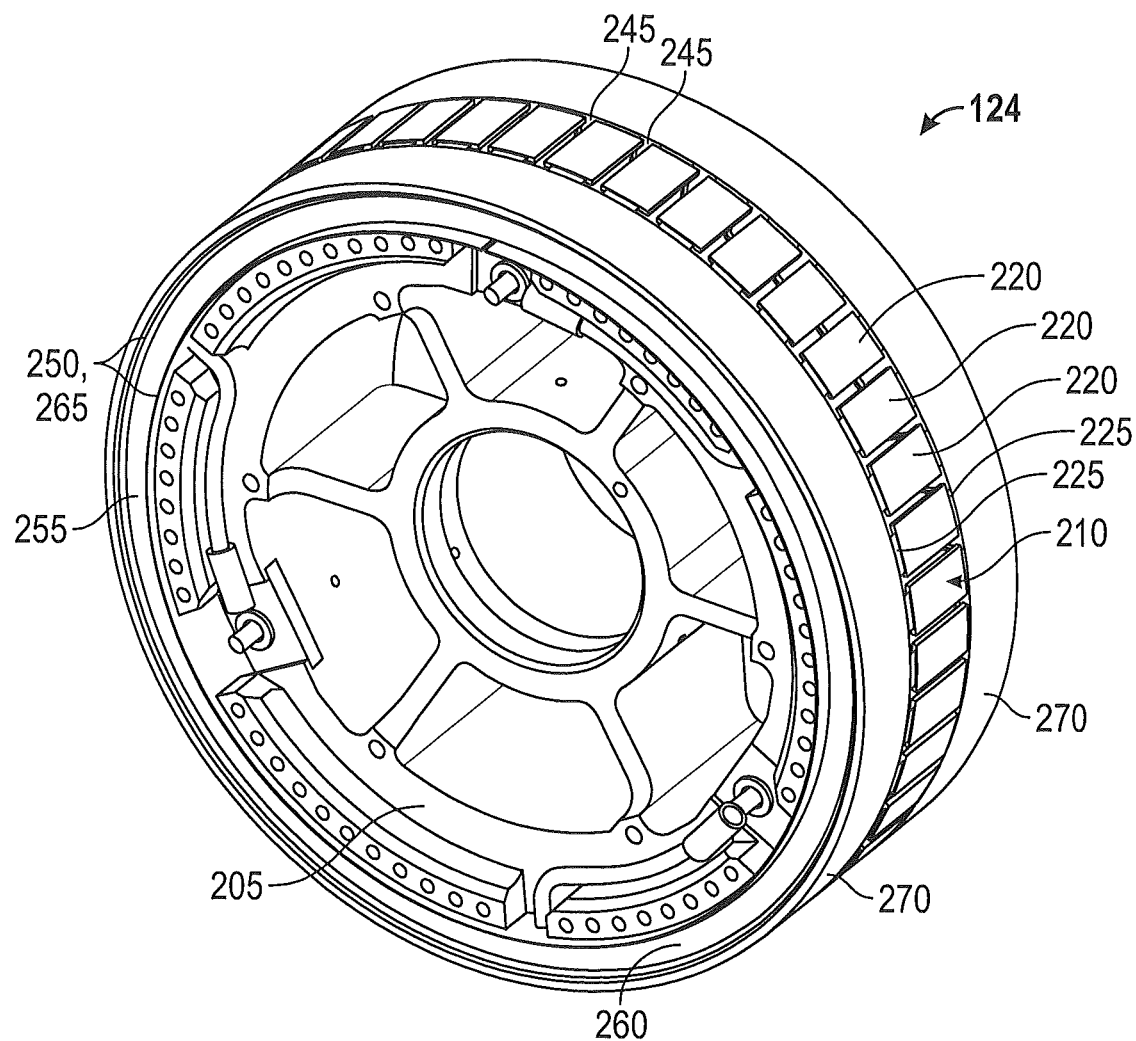
FIG. 3 is an assembled perspective view of an exemplary rotor exciter assembly.

Referring now to FIGS. 2 and 3, the structure of an exemplary exciter rotor 124 is illustrated having a generally cylindrical hub 205 acting as the main support structure of the exciter rotor 124. It shall be understood that while the following description is related to exciter rotors, the teachings provided herein could be applied to a rotor of any type of dynamoelectric machine. A ring-type lamination 210 is attached to the cylindrical hub 205. In another embodiment, the ring-type lamination 210 may act as the hub for the exciter rotor. That is, in such an embodiment, the cylindrical hub 205 may be omitted.

The lamination 210 has cutouts 215 extending radially inward from the outer circumference such that the lamination 210 has teeth 220 protruding outward. Insulating sheets or rings 225 are positioned on opposite sides of the lamination 210. Each insulating ring 225 includes cutouts 230 which form a plurality of teeth 235 disposed around the circumference. The cutouts 230 and teeth 235 of the insulating rings 225 are equivalent to and aligned with the cutouts 215 and teeth 220 of the lamination 210. The exciter rotor 124 may include a balancing ring 240 positioned adjacent one of the insulating rings 225 to prevent movement of the laminations 220 and the insulating rings 225.

Slot insulation 245 is placed within the cutouts 215, 230 of both the laminations 210 and the insulating rings 225. A first pair of insulating bands or sheets 250 is positioned around hub 205 near the insulating ring 225 and around the balancing ring 240. Wire windings 155 are wound around the teeth 220, 235 of the laminations 210 and the insulating rings 225. The slot insulation 245 insulates the wire windings 255 from the laminations 210. The wire windings 255 include end turns 260 which cover a first and second insulating sheet or band 250 to connect the windings together. A second set of insulating bands or sheets 265 is positioned over each of the end turns 260 and first and second end bands 270 are placed over the second set of insulating bands 265. The end bands 270 assist in holding the end turns 260 of the wire winding 255 in position despite the significant centrifugal forces experienced by the exciter rotor assembly 124 during operation. The aforementioned end band and exciter rotor are provided as a non-limiting embodiment. Numerous other configurations of an end band are considered to be within the scope of an exemplary embodiment of the invention, such as end bands used on a permanent magnet generator (PMG) rotor and a ram air turbine (RAT) main rotor.

Figure 4:
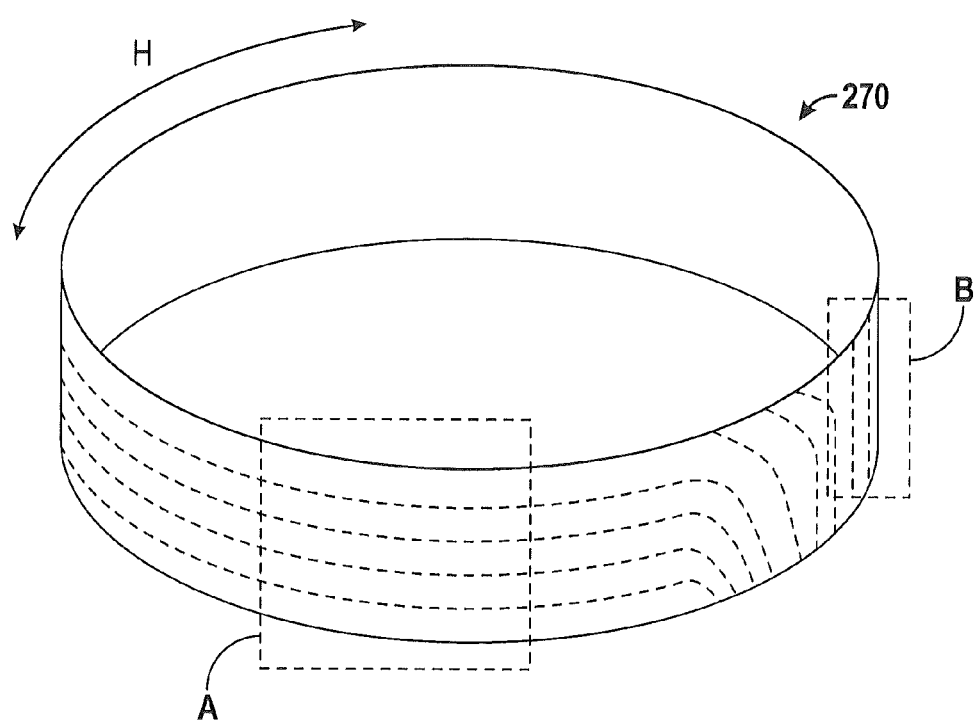
FIG. 4 is an end band according to an embodiment of the invention.

Referring now to FIG. 4, an exemplary end band 270 according to an embodiment of the invention is illustrated. The end band 270 is a hollow cylinder having an inner diameter large enough to fit around the outer diameter of an assembled rotor, such as exciter rotor 124 for example. The end band 270 may be made from a metal or an alloy, such as Inconel for example. The rotation of a rotor and an attached end band 270 creates a hoop stress along the circumference of the end band 270 in the direction illustrated by arrow H. Conventional end bands 270 are machined from a piece of bar stock and have a uniform grain flow in a direction. This uniform grain flow is parallel to the width of the end band and perpendicular to the direction of the hoop stress. In an exemplary embodiment, an end band 270 is formed from a sheet of material having a uniform grain flow across the sheet. The formed end band 270, however, has a non-uniform grain flow that varies along the circumference of the end band 270.

Some portions of the end band 270, such as section A, have a grain flow in a direction parallel to the width of the end band 270 or perpendicular to the hoop stress. Other portions of the end band 270, exemplified by section B, have a longitudinal grain flow around the circumference of the end band 270 in a direction parallel to the hoop stress of the end band 270. The areas of the end band 270 having grain flow perpendicular to the hoop stress are separated from the areas having grain flow parallel to the hoop stress by transitional areas where the flow is neither perpendicular nor parallel to the hoop stress. According to the teachings herein, it has been determined that the portions of the end band 270 having a transitional grain flow and the portions having a grain flow in a direction parallel to the hoop stress may have a better fatigue life than those areas having a grain flow perpendicular to the hoop stress. Therefore, because the sheet metal end band 270 has a varying grain flow around its circumference, it has a better fatigue life than a conventional end band made from bar stock.

Figure 5:
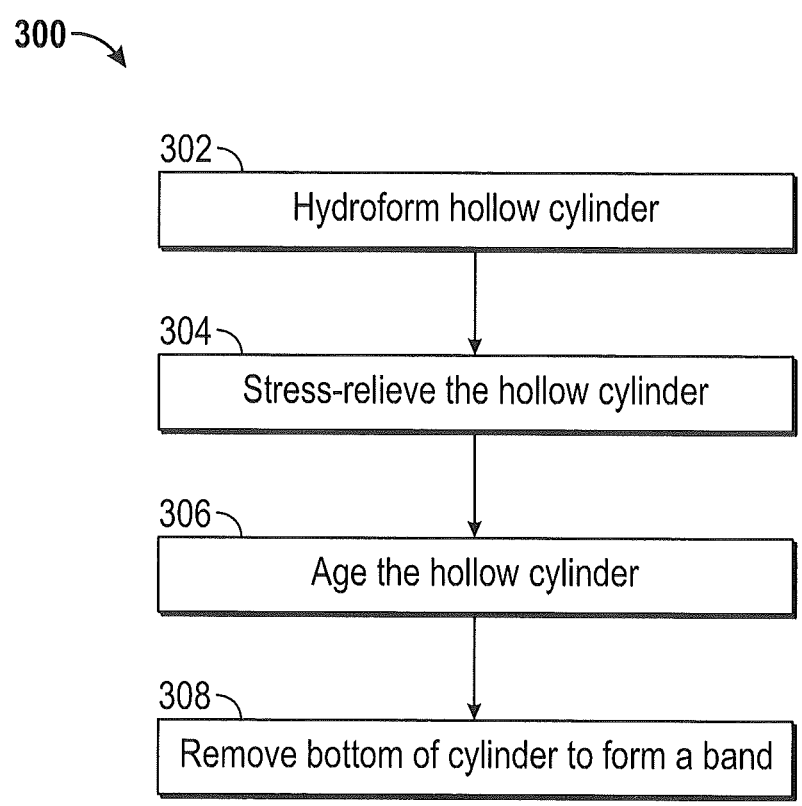
FIG. 5 illustrates a process for manufacturing an end band according to an embodiment of the invention.

An exemplary process 300 for manufacturing an end band 270 is illustrated in FIG. 5. In block 302, a sheet metal end band 270 is formed by hydroforming a hollow cylinder having an open end from a sheet of a desired material. In one embodiment, the height of the cylinder is substantially equivalent to the width of the end band 270. In another embodiment, the height of the cylinder may be substantially equal to the width of a plurality of end bands 270. The hydroforming process creates internal residual stresses within the formed hollow cylinder which may be reduced using a heat-treating process. Aging of the hollow cylinder directly after hydroforming, however, increases the grain size of the material. Because grain size is inversely proportional to fatigue life it is desirable to reduce the grain size of the hollow cylinder to improve its endurance and fatigue life. To control the growth of the grain size and to achieve a grain size at least comparable to the grain size of an end band machined from a piece of bar stock, the hollow cylinder is stress-relieved after being hydroformed, as illustrated in block 304. The stress-relieving process involves heating the hollow cylinder to a temperature lower than the temperature of an aging process, and allowing the hollow cylinder to cool slowly to restore the grain size. After being stress-relieved, the hollow cylinder is then aged, as shown in block 306, such that the sheet metal hollow cylinder has a grain size comparable or smaller than that of a conventional bar stock end band. Grain size is inversely proportional to grain size number. In one embodiment, the desired resultant grain size number of the hollow cylinder and resultant end band 270 is approximately 9. Because deformation of the hollow cylinder may occur during the aging processes, the bottom of the hollow cylinder is removed afterwards, shown in block 308, such as by machining for example, to form an end band 270 having a desired wall thickness and inner diameter.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:
1. A method for manufacturing an end band comprising:
    forming a hollow cylinder having an open end and a closed end via a hydroforming process;
    stress-relieving the hollow cylinder at a first temperature;
    aging the hollow cylinder at a second temperature greater than the first temperature after stress-relieving the hollow cylinder; and removing the closed end of the hollow cylinder after aging the hollow cylinder to form an end band.

2. The method for manufacturing an end band according to claim 1, further comprising forming the hollow cylinder from a flat sheet of material.

3. The method for manufacturing an end band according to claim 1, wherein a height of the hollow cylinder is the same as a width of the end band.

4. The method for manufacturing an end band according to claim 1, wherein a height of the hollow cylinder is the same as a width of a plurality of end bands.

5. The method for manufacturing an end band according to claim 1, wherein the closed end of the hollow cylinder is removed by machining.

6. The method for manufacturing an end band according to claim 1, wherein the hollow cylinder is aged to reduce internal stresses in the band.

7. The method for manufacturing an end band according to claim 1, wherein the hollow cylinder is stress-relieved to control the growth of the grain size.

8. The method for manufacturing an end band according to claim 1, wherein at least one portion of the end band has a first grain flow in a direction along a circumference of the end band and at least one portion of the end band has a second grain flow in a direction parallel to a width of the end band.

* * * * *